United States Patent [19]

Miller

[11] Patent Number: 4,727,292
[45] Date of Patent: Feb. 23, 1988

[54] HIGH VOLTAGE POWER SUPPLY FAULT ISOLATION SYSTEM

[75] Inventor: Daniel G. Miller, Mount Laurel, N.J.

[73] Assignee: The United States of America as represented by the Secretary of the Air Force, Washington, D.C.

[21] Appl. No.: 835,923

[22] Filed: Mar. 4, 1986

[51] Int. Cl.[4] .................. H05B 39/04; H05B 41/36
[52] U.S. Cl. .................................. 315/107; 315/94; 315/106; 315/307; 328/270
[58] Field of Search ............... 315/307, 308, 106, 107, 315/94, 291; 328/270

[56] References Cited

U.S. PATENT DOCUMENTS

| | | | |
|---|---|---|---|
| 3,916,251 | 10/1975 | Hernandez et al. | 315/308 |
| 4,090,106 | 5/1978 | Okumura et al. | 315/107 |
| 4,149,110 | 4/1979 | Dallos | 315/107 |
| 4,156,166 | 5/1979 | Shapiro et al. | 315/209 R |
| 4,247,801 | 1/1981 | Dallos et al. | 315/107 |
| 4,253,048 | 2/1981 | Osako | 315/307 |
| 4,314,182 | 2/1982 | Thomas et al. | 315/307 |
| 4,350,891 | 9/1982 | Wuerflein | 315/308 |
| 4,415,839 | 11/1983 | Lesea | 315/209 R |
| 4,421,993 | 12/1983 | Bloomer | 307/126 |
| 4,439,868 | 3/1984 | Makino et al. | 315/307 |
| 4,525,652 | 6/1985 | Sperzel et al. | 315/107 |

Primary Examiner—Saxfield Chatmon
Attorney, Agent, or Firm—William G. Auton; Donald J. Singer

[57] ABSTRACT

An electronics circuit for improving the fault isolation of failures between an electron tube radio frequency (RF) amplifier and its high voltage power supply is disclosed. High voltage power supplies control their output voltage by comparing a feedback voltage against a reference. This comparison is used to develop an error voltage which, in turn, drives a pulsewidth modulator that corrects the feedback voltage to the reference. The output of a digital-to-analog converter (DAC) is used as the reference voltage. The DAC is driven by a counter which would count to the correct reference voltage represented by a specific count. The final count is determined by a comparator which compares the counter output to the desired final count and stops the counter when it is reached.

1 Claim, 1 Drawing Figure

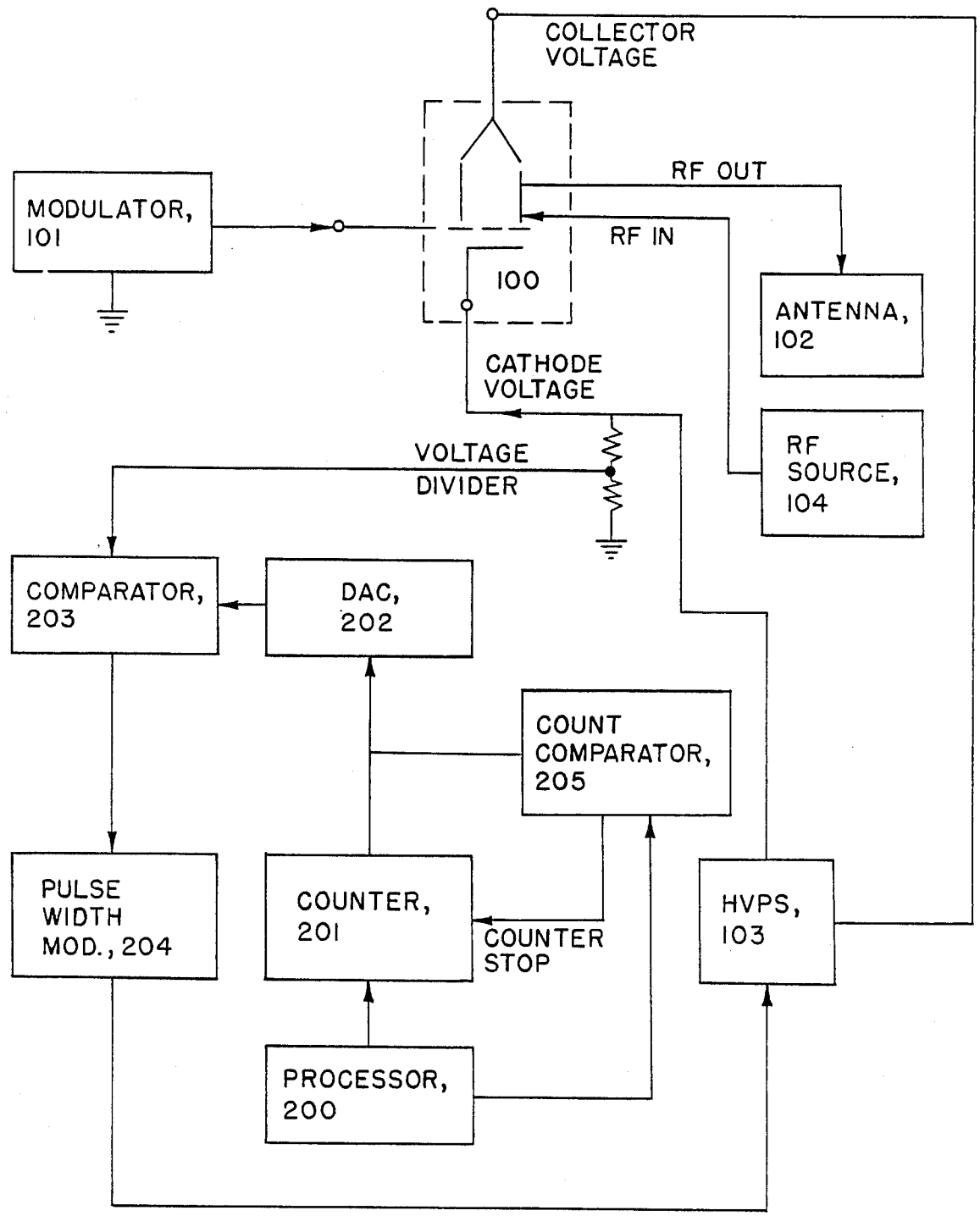

HIGH VOLTAGE POWER SUPPLY FAULT ISOLATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to fault isolation system of RF transmission systems, and more specifically to a mechanization which helps adjust the cathode voltage during an automatic fault isolation routine.

It has always been difficult to fault isolate failures between an electron tube RF amplifier and its high voltage power supply (H.V.P.S.). The main fault isolation difficulty between an electron tube RF amplifier and its high voltage power supply arises when the failure prevents turnon of the high voltage supply. Some of the more common reasons for this are: tube arc, improper cathode voltage, improper collector voltage, or a power supply failure. This assumes that all other tube voltages have been checked such as: filament voltage and current, grid bias, grid voltage and other anode voltages.

The task of correcting the voltage supplied to RF amplifiers in conjunction with fault isolation is alleviated, to some degree, by the prior art techniques of the following U.S. Patents, which are incorporated herein by reference:

U.S. Pat. No. 4,421,993 issued to M. D. Bloomer on Dec. 20, 1983;
U.S. Pat. No. 4,247,801 issued to Dallos et al on Jan. 27, 1981;
U.S. Pat. No. 4,090,106 issued to Okumura et al on May 16, 1978;
U.S. Pat. No. 4,149,110 issued to Dallos on Apr. 10, 1979; and
U.S. Pat. No. 4,156,166 issued to Shapiro et al on May 22, 1979.

U.S. Pat. No. 4,421,993 discloses a load resistance control circuit which compares the actual value of a non-zero temperature coefficient load resistance to a desired load resistance magnitude. U.S. Pat. Nos. 4,247,801 and 4,149,110 each disclose a cathode current control system which includes an external circuit connected to the cathode and other electrodes of an electron discharge device for maintaining the electrodes at respective predetermined electrical potentials relative to the cathode.

U.S. Pat. No. 4,090,106 discloses a power supply circuit for an electron gun which automatically controls a voltage to be applied to a cathode so as to make an emission current constant. U.S. Pat. No. 4,156,166 discloses an electronics circuit for regulating the output flux generated by a lamp with the degeneration of the voltage from a power supply.

Conventional fault isolation systems normally bring power from the H.V.P.S. to the RF amplifier in a procedure which brings voltage all the way up in one step in a short time period. However, experience has shown that over 90% of the faults in the H.V.P.S. prevent even partial applications of voltage, while very few of the faults in the electron tube RF amplifier prevent at least a partial application of voltage.

From the foregoing discussion, it is apparent that there currently exists the need for a fault isolation system between a high voltage power supply and an electron tube RF amplifier that allows a partial application of voltage during a fault isolation test. The present invention is intended to satisfy that need.

SUMMARY OF THE INVENTION

The present invention is a system which isolates faults between an electron tube RF amplifier and its high voltage power supply. The present invention allows a partial application of voltage during fault isolation using: a microprocessor, a counter, a digital-to-analog converter (DAC), two comparators, (one digital, one analog) and a pulsewidth modulator.

The counter, under the control of the microprocessor and the count (digital) comparator produces a digital reference signal which represents the desired feedback cathode voltage of the RF amplifier. The digital reference signal is converted into an analog reference signal by the DAC and sent to the comparator. The comparator produces an error voltage signal by comparing the feedback cathode voltage signal with the analog reference signal. Typical of comparators are devices which simply subtract a signal from another.

The error voltage signal from the comparator is sent to the pulsewidth modulator, which adjusts the "on" time of the switching regulator portion of the high voltage power supply until the feedback cathode signal is equal to the analog reference. This means that the cathode voltage is now at the desired value. A typical pulsewidth modulator is the SG 1524. The pulsewidth modulator is used to close the feedback loop around the high voltage supply so that the RF amplifier cathode voltage will be adjusted and maintained at the voltage represented by the analog reference voltage produced by the microprocessor, the count comparator and the counter.

The counter, count comparator and microprocessor work in The following way. The microprocessor loads the count comparator with a count which represents the desired final value of RF amplifier cathode voltage. The microprocessor then enables the counter and it begins to count up causing the analog reference to increase from zero value. The comparator (analog) produces an error voltage which causes the pulsewidth modulator to gradually increase cathode voltage. The counter continues to count up and the cathode voltage is also gradually increased until the counter reaches the preload final value whereupon the counter is stopped and the count is held at the final value. The cathode voltage will then stabilize at the voltage represented by the resultant analog reference voltage and the feedback control loop maintains this voltage.

As described above, the invention can direct the H.V.P.S. to gradually supply cathode voltage by ramping its output. Additionally, the microprocessor can digitally set the value of the reference signal of the counter to some known value, then test to determine if the expected value was reached.

It is an object of the present invention to fault isolate failures between a high voltage power supply and an electron tube RF amplifier.

It is another object of the present invention to gradually adjust the cathode voltage of the electron tube RF amplifier until it reaches its desired level.

It is another object of the present invention to control the voltage from the high voltage power supply with a digital word, which may be adjusted by a digital processor.

These objects together with other objects, features and advantages of the invention will become more readily apparent from the following detailed description when taken in conjunction with the accompanying drawings wherein like elements are given like reference numerals throughout.

BRIEF DESCRIPTION OF THE DRAWING

The sole FIGURE of the drawing is a block diagram of an embodiment of the present invention.

DETAILED DESCRIPTION OF THE PREFERRED EMBODIMENT

The present invention is a system which improves the fault isolation of failures between an electron tube RF amplifier and its high voltage power supply.

The reader's attention is now directed towards the FIGURE, which is a block diagram of an embodiment of the present invention. The electron tube RF amplifier 100 receives waveforms from modulator 101 over its grid input. These waveforms gate the beam of the RF amplifier 100 which amplifies the input from the RF source 104 as it passes through the RF circuit and is fed to the antenna 102 through the RF output. The H.V.P.S. 103 provides to the RF amplifier the DC power which is converted to RF in the RF circuit. The present invention samples the cathode voltage of the RF amplifier, compares it with a known reference value, and incrementally adjusts the output of the high voltage power supply 103 until the desired cathode voltage is reached.

In the Figure a microprocessor 200 controls a counter 201 so that it outputs a digital reference signal which represents the expected cathode voltage level. The DAC 202 converts the digital reference signal to an analog reference signal which represents the expected cathode voltage level.

The comparator 203 produces an error voltage by comparing the analog reference signal from the DAC 202 with the sampled feedback signal from a high voltage divider. Typical comparators are high gain devices which generate an output signal when the two compared signals differ. For the system of the FIGURE, the error voltage might be expressed as the difference between the feedback cathode voltage and the reference voltage from the DAC times a gain of 80 db for frequencies close to DC.

The error voltage signal from the comparator 203 is sent to the pulsewidth modulator 204, which sends an adjustment signal to the high voltage power supply 103, directing it to adjust the cathode voltage signal until it is correct. A typical pulsewidth modulator is a Signetics 1524. If the feedback voltage is less than the reference voltage, then the error voltage will cause the H.V.P.S. output to increase until the feedback voltage equals the reference voltage.

As long as a error voltage is increasing, the pulsewidth modulator 204 sends a pulse to the high voltage power supply directing it to step up its voltage until the desired value is reached. At that point, the difference between the reference voltage and feedback voltage is zero, and the error voltage will cease to increase causing the pulsewidth modulator to maintain the same pulsewidth.

During start up, the system of the FIGURE directs the high voltage power supply to gradually adjust and supply cathode voltage by ramping its output. Additionally, the microprocessor 200 can digitally set the value of the reference signal of the counter 201 to different known values for various forms of diagnostics testing. During each of the various diagnostics, the cathode voltage is measured and compared to what it should be, based on the commanded reference voltage.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A fault isolation system for use with a high voltage power supply which supplies an electron tube radio frequency amplifier which has a grid terminal, cathode terminal and collector terminal, said grid terminal receiving waveforms from a modulator, said cathode terminal receiving cathode voltage from said high voltage power supply, and said collector terminal receiving collector voltage from said high voltage power supply, said fault isolation system sensing levels of said cathode voltage and sending an adjustment signal to direct said high voltage power supply to step up its voltage output until said cathode voltage is adjusted to its proper level, said fault isolation system comprising:

a means for sampling voltage produced by a voltage supply, said sampling means producing a feedback signal;

a counter which produces a digital reference signal which indicates an of expected value of said feedback signal; and a digital-to-analog converter which produces said reference signal by receiving and converting into analog said digital reference signal from said counter;

a data processor which is connected to said counter and allows a user to set said expected value in said counter to different levels;

a comparator which produces an error signal by receiving and substracting said feedback signal from said sampling means from said reference signal received from said digital-to-analog converter; and a pulsewidth modulator which sends a series of pulses to said high voltage power supply which controls its voltage output, said pulsewidth modulator sending said series of pulses as long as it receives said error voltage signal from said comparator, said pulsewidth modulator thereby incrementally adjusting said cathode voltage until it is at its proper level.

* * * * *